US012720493B2

(12) United States Patent
Gürsu et al.

(10) Patent No.: US 12,720,493 B2
(45) Date of Patent: Aug. 25, 2026

(54) TEMPORARY TRACKING AREA SUPPORT CROSS-REFERENCE TO RELATED APPLICATIONS

(71) Applicant: Nokia Technologies Oy, Espoo (FI)

(72) Inventors: Halit Murat Gürsu, Munich (DE); Ömer Bulakci, Munich (DE); Alessio Casati, West Molesey (GB); Rajesh Babu Natarajan, Bangalore (IN); Philippe Godin, Massy (FR); Ugur Baran Elmali, Munich (DE); Arled Papa, Munich (DE); Muhammad Naseer-Ul-Islam, Munich (DE)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 18/544,964

(22) Filed: Dec. 19, 2023

(65) Prior Publication Data

US 2024/0214987 A1 Jun. 27, 2024

(30) Foreign Application Priority Data

Dec. 23, 2022 (GB) ..................................... 2219676

(51) Int. Cl.

| | |
|---|---|
| ***H04W 68/02*** | (2009.01) |
| ***H04W 60/04*** | (2009.01) |
| ***H04W 76/20*** | (2018.01) |
| ***H04W 76/30*** | (2018.01) |

(52) U.S. Cl.

CPC ........... *H04W 68/02* (2013.01); *H04W 60/04* (2013.01); *H04W 76/20* (2018.02); *H04W 76/30* (2018.02)

(58) Field of Classification Search

CPC ..... H04W 68/02; H04W 76/20; H04W 76/30; H04W 60/04

USPC .......................................................... 455/458

See application file for complete search history.

(56) References Cited

U.S. PATENT DOCUMENTS

| | | | | |
|---|---|---|---|---|
| 11,064,341 | B2 | 7/2021 | He | |
| 11,356,838 | B2 | 6/2022 | Rugeland et al. | |
| 2018/0234890 | A1 | 8/2018 | Shih et al. | |
| 2019/0150221 | A1* | 5/2019 | Tseng | H04W 36/0055 370/331 |

(Continued)

FOREIGN PATENT DOCUMENTS

| | | | |
|---|---|---|---|
| EP | 3993466 | A1 | 5/2022 |
| WO | 2018/234890 | A1 | 12/2018 |

(Continued)

OTHER PUBLICATIONS

"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.

(Continued)

*Primary Examiner* — Mark G. Pannell

(74) *Attorney, Agent, or Firm* — Barta Jones, PLLC

(57) ABSTRACT

A method performed at an apparatus for configuration of a Radio Access Network (RAN) Notification Area (RNA) is provided. The method comprises receiving a message including RNA information to be temporarily added to the RNA, and timing information associated to the RNA information. The method further comprises configuring the RNA by temporarily adding the RNA information to the RNA based on the timing information.

15 Claims, 11 Drawing Sheets

(56) References Cited

U.S. PATENT DOCUMENTS

| | | | | |
|---|---|---|---|---|
| 2019/0202516 | A1 | 7/2019 | Yamamoto et al. | |
| 2020/0178204 | A1* | 6/2020 | Chen | H04W 8/08 |
| 2020/0374942 | A1* | 11/2020 | Sivavakeesar | H04W 68/00 |
| 2021/0067945 | A1* | 3/2021 | Liu | H04W 48/20 |
| 2021/0306806 | A1 | 9/2021 | Dang et al. | |
| 2021/0337623 | A1 | 10/2021 | Tseng et al. | |
| 2022/0070958 | A1 | 3/2022 | Khlass et al. | |
| 2022/0086688 | A1 | 3/2022 | Jin et al. | |
| 2022/0095412 | A1 | 3/2022 | Lindheimer et al. | |

FOREIGN PATENT DOCUMENTS

| | | | |
|---|---|---|---|
| WO | 2020/064651 | A1 | 4/2020 |
| WO | 2021/197048 | A1 | 10/2021 |
| WO | 2022/061583 | A1 | 3/2022 |
| WO | 2022/191599 | A1 | 9/2022 |

OTHER PUBLICATIONS

"3rd Generation Partnership Project; Technical Specification Group Services and System Aspects; Procedures for the 5G System (5GS); Stage 2 (Release 17)", 3GPP TS 23.502, V17.5.0, Jun. 2022, pp. 1-744.
"Msc-generator", Sourceforge, Retrieved on Dec. 12, 2023, Webpage available at :https://sourceforge.net/projects/msc-generator/.
"5G; NR; NR and NG-RAN Overall description; Stage-2 (3GPP TS 38.300 version 17.0.0 Release 17)", ETSI TS 138 300, V17.0.0, May 2022, 207 pages.
"5G; NR; Radio Resource Control (RRC); Protocol specification (3GPP TS 38.331 version 17.0.0 Release 17)", ETSI TS 138 331, V17.0.0, May 2022, 1197 pages.
"IEEE 802.11", Wikipedia, Retrieved on Jan. 4, 2024, Webpage available at : https://en.wikipedia.org/wiki/IEEE_802.11.
"IEEE 802.16", Wikipedia, Retrieved on Mar. 24, 2024, Webpage available at : https://en.wikipedia.org/wiki/IEEE_802.16#:~:text=IEEE%20802. 16%20is%20a%20series%20of%20wireless%20broadband,standards%20for%20broadband%20for%20wireless%20metropolitan%20area%20networks.
"IEEE 802.3", Wikipedia, Retrieved on Mar. 24, 2024, Webpage available at : https://en.wikipedia.org/wiki/IEEE_802.3.
"IEEE 802.15", Wikipedia, Retrieved on Mar. 24, 2024, Webpage available at : https://en.wikipedia.org/wiki/IEEE_802.15#:~:text=IEEE%20802.15%20is%20a%20working%20group%20of%20the,as%20Working%20Group%20for%20Wireless%20Personal%20Area%20Networks.
"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.
Search Report received for corresponding United Kingdom Patent Application No. 2219676.0, dated Jun. 22, 2023, 3 pages.
Search Report received for corresponding United Kingdom Patent Application No. 2219675.2, dated Jun. 23, 2023, 5 pages.
"3rd Generation Partnership Project; Technical Specification Group Services and System Aspects; Study on enhancement of network slicing; Phase 3 (Release 18)", 3GPP TR 23.700-41, V18.0.0, Dec. 2022, pp. 1-167.
"KI#3: New Solution "On handling of temporary network slices"", 3GPP TSG-WG SA2 Meeting #151E e-meeting, S2-2204379, Agenda: 9.14, Nokia, May 16-20, 2022, pp. 1-8.
"KI#3 Updated evaluations and conclusions", 3GPP TSG-WG SA2 Meeting #154 e-meeting, S2-2210717, Agenda: 9.14, Nokia, Nov. 14-18, 2022, pp. 1-6.
Extended European Search Report received for corresponding European Patent Application No. 23217065.4, dated May 3, 2024, 12 pages.
"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.
"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

* cited by examiner

TEMPORARY TRACKING AREA SUPPORT CROSS-REFERENCE TO RELATED APPLICATIONS

CROSS-REFERENCE TO RELATED APPLICATIONS

This application claims the benefit of priority of United Kingdom Patent Application No. 2219676.0 filed Dec. 23, 2022, which is hereby incorporated by reference in its entirety.

FIELD

The present disclosure generally relates to mobile communication networks such as a 5G communication network, and more particularly to tracking area support.

BACKGROUND

Every time a mobile device registers within a mobile network, various information is saved. The plurality of registrations that happen through the movement of the mobile device within the mobile network are stored as a tracking area (TA), even onetime only used cells for a specific network slice. Nearby cells are grouped as one tracking area and the sum of all tracking areas form the registration area (RA) of a mobile device as described by the 3$^{rd}$ Generation Partnership Project (3GPP) Technical Specification (TS) 23.501. In other words, a registration area is a list of tracking areas for a mobile device, and is configured by the core network (CN) to the mobile device. Once the mobile device goes outside of the TAs in the Registration Area, it needs to perform a Registration Area Update, and the core network re-evaluates the TAs in the RA to configure a new registration area (3GPP TS 23.501).

A mobile device that is roaming freely, i.e., in the RRC INACTIVE state in 5G standard, can be found from the network by paging the base stations and the corresponding cells of the tracking areas. The 5G standard with its introduced RRC INACTIVE state, enables low signaling overhead to find the current location of the mobile device.

The core network uses a radio access network notification area to effectively find the mobile device. The notification area can cover a single or multiple cells and shall be contained within the registration area. The mobile device informs the network every time a new cell or tracking area is added to the RA to update the notification area and to allow the mobile device to be located in the event of RRC state change.

The present disclosure is directed to improve the integration of temporary tracking areas into the radio access network notification area while the mobile device is in the inactive state.

SUMMARY

According to a first aspect, a method performed at an apparatus for configuration of a Radio Access Network (RAN) Notification Area (RNA) is provided. The method comprises receiving a first message including Tracking Area (TA) information indicating timing information for at least one temporary TA, and receiving a second message including RNA information indicating a cell to be added to the RNA and the TA to which the cell belongs. The method further comprises configuring the RNA with the received timing information for the at least one temporary TA. When the TA to which the cell (i.e., the cell which is to be added to the RNA) belongs is the at least one temporary TA (i.e., if it is the temporary TA in case of one temporary TA or one of the temporary TAs in case of more than one temporary TA), temporarily adding the cell to the RNA based on the timing information for the at least one temporary TA.

According to a second aspect, a method performed at an apparatus for configuration of an RNA is provided. The method comprises receiving a first message including Tracking Area (TA) information indicating timing information for at least one temporary TA, and receiving a second message including RNA information indicating a TA to be added to the RNA. The method further comprises configuring the RNA with the received timing information for the at least one temporary TA, and, when the TA received in the second message is the temporary TA configured in the first message, temporarily adding the at least one temporary TA to the RNA based on the timing information for the at least one temporary TA.

In some embodiments, the apparatus is one of a user equipment (UE) a baseband module, an antenna, or any combination thereof.

In some embodiments, the apparatus is a UE, and the first message is received by the UE over Non-Access Stratum (NAS) signaling from the Access and Mobility Management Function (AMF).

In some embodiments, the second message is a Radio Resource Control (RRC) message received from a RAN node.

In some embodiments, the apparatus is a UE, and configuring the RNA with the received timing information comprises indicating, by the UE Non-Access Stratum (NAS) the timing information to UE Access Stratum (AS) for the at least one temporary tracking area.

In some embodiments, the timing information comprises a time period during which the cell or the temporary TA is added to the RNA.

For example, the time period can be defined by a first point of time and a second point of time wherein the second point of time is after the first point of time, and wherein the cell or the temporary TA is added to the RNA at the first point of time and removed from the RNA at the second point of time.

In some embodiments, the apparatus determines, based on the received TA information, whether the TA to which the cell belongs is the at least one temporary TA.

In some embodiments, the apparatus determines that the TA to which the cell belongs is the at least one temporary TA upon receiving the second message.

According to a third aspect, a method for a Radio Access Network (RAN) Notification Area (RNA) configuration of a UE configured with Tracking Area (TA) information indicating timing information for at least one temporary TA is provided. The method comprises, at the RAN node, transmitting a message to the UE, the message including RNA information indicating a cell to be added to the RNA of the UE, and determining whether the cell belongs to the at least one temporary TA. When the cell belongs to the at least one temporary TA, the RNA information included in the message transmitted to the UE further indicates the TA to which the cell belongs.

In some embodiments, the message is a Radio Resource Control (RRC) Release message.

According to a fourth aspect, an apparatus configured with a Radio Access Network (RAN) Notification Area (RNA), is provided. The apparatus comprises a processor and a memory with instructions which, when executed by the processor, cause the apparatus to receive a first message including Tracking Area (TA) information indicating timing information for at least one temporary TA, and to receive a second message including RNA information indicating a cell to be added to the RNA and the TA to which the cell belongs. The instructions, when executed by the processor, further cause the apparatus to configure the RNA with the received timing information for the at least one temporary TA. When the TA to which the cell belongs is the at least one temporary TA, the instructions further cause the apparatus to temporarily add the cell to the RNA based on the timing information for the at least one temporary TA.

According to a fifth aspect, an apparatus configured with a Radio Access Network (RAN) Notification Area (RNA), is provided. The apparatus comprises a processor and a memory with instructions which, when executed by the processor, cause the apparatus to receive a first message including Tracking Area (TA) information indicating timing information for at least one temporary TA, and to receive a second message including RNA information indicating a TA to be added to the RNA. The instructions, when executed by the processor, further cause the apparatus to configure the RNA with the received timing information for the at least one temporary TA, and, when the TA received in the second message is the temporary TA configured in the first message, to temporarily add the at least one temporary TA to the RNA based on the timing information for the at least one temporary TA.

In some embodiments, the apparatus is one of a user equipment (UE) a baseband module, an antenna, or any combination thereof.

In some embodiments, the apparatus is a UE, and the first message is received by the UE over Non-Access Stratum (NAS) signaling from the Access and Mobility Management Function (AMF).

In some embodiments, the second message is a Radio Resource Control (RRC) message received from a RAN node.

In some embodiments, the apparatus is a UE, and configuring the RNA with the received timing information comprises indicating, by the UE Non-Access Stratum (NAS) the timing information to UE Access Stratum (AS) for the at least one temporary tracking area.

In some embodiments, the timing information comprises a time period during which the cell or the temporary TA is added to the RNA. For example, the time period can be defined by a first point of time and a second point of time wherein the second point of time is after the first point of time, and wherein the cell or the temporary TA is added to the RNA at the first point of time and removed from the RNA at the second point of time.

In some embodiments, the apparatus determines, based on the received TA information, whether the TA to which the cell belongs is the at least one temporary TA.

In some embodiments, the apparatus determines that the TA to which the cell belongs is the at least one temporary TA upon receiving the second message.

According to a sixth aspect, a Radio Access Network (RAN) node is provided. The RAN node is communicatively coupled to a user equipment (UE) and configured with a Radio Access Network (RAN) Notification Area (RNA). The RAN node comprises a processor and a memory with instructions which, when executed by the processor, cause the RAN node to transmit a message to the UE, the message including RNA information indicating a cell to be added to the RNA of the UE, and to determine whether the cell belongs to the at least one temporary TA. When the cell belongs to the at least one temporary TA, the RNA information included in the message transmitted to the UE further indicates the TA to which the cell belongs.

In some embodiments, the message is a Radio Resource Control (RRC) message.

In a further example, a method performed at an apparatus for configuration of a RAN Notification Area (RNA) comprises receiving a message including RNA information to be temporarily added to the RNA, and timing information associated to the RNA information. The method further comprises configuring the RNA by temporarily adding the RNA information to the RNA based on the timing information.

In some examples, the timing information comprises a time period during which the RNA information is to be temporarily added to the RNA. For example, the time period can be defined by a first point of time and a second point of time wherein the second point of time is after the first point of time, and wherein the cell or the temporary TA is added to the RNA at the first point of time and removed from the RNA at the second point of time.

In some examples, the RNA information includes at least one of a cell identifier (ID) and an identifier of a Tracking Area (TA). In one example the tracking area identifier is the tracking area code.

In some examples, the timing information comprises at least one of a first time period associated to the cell ID and a second time period associated to the identifier of the Tracking Area.

In some examples, the method further includes determining an expiration of the time period associated to a serving cell for the apparatus, the serving cell being indicated by a cell identifier included in the RNA information, and sending a RAN notification area update based on the determined expiration of the time period.

In some examples, the method further includes determining an expiration of the time period associated to a TA including a serving cell for the apparatus, the TA being indicated by an identifier of a TA included in the RNA information and the identifier of the serving cell not being included in the RNA, and sending a RAN notification area update based on the determined expiration of the time period.

In some examples, the message is a RRC Release message received from a RAN node.

In another example, a method for a RAN Notification Area (RNA) configuration of a UE comprises, at a RAN node having TA information indicating timing information for at least one temporary TA, transmitting a message to the UE, the message including RNA information indicating a cell and/or a TA, to be added to the RNA of the UE. The method further comprises determining whether the cell and/or the TA to be added to the RNA of the UE belongs to the at least one temporary TA, wherein, when the cell and/or the TA belongs to the at least one temporary TA, the RNA information included in the message transmitted to the UE further indicates the timing information for the temporary cell/TA.

In some examples, the message is a Radio Resource Control (RRC) Release message.

In some examples, the timing information comprises a time period during which the cell and/or the TA is to be added to the RNA of the UE.

In another example, an apparatus for configuration of a Radio Access Network, RAN, Notification Area, RNA, comprises at least one processor and at least one memory storing instructions. The instructions, when executed by the at least one processor, cause the apparatus at least to receive a message including RNA information to be temporarily added to the RNA, and timing information associated to the RNA information, and to configure the RNA by temporarily adding the RNA information to the RNA based on the timing information.

In some examples, the message is a RRC Release message, and the apparatus is caused to receive the message from a RAN node.

In some examples, the timing information comprises a time period during which the RNA information is to be temporarily added to the RNA.

In some examples, the RNA information includes at least one of a cell identifier (ID) and an identifier of a Tracking Area (TA).

In another example, a Radio Access Network (RAN) node, being communicatively coupled to a user equipment (UE) configured with a RAN Notification Area (RNA) is provided. The RAN node comprises a processor and a memory with instructions which, when executed by the processor, cause the RAN node to provide Tracking Area (TA) information indicating timing information for at least one temporary TA, transmit a message to the UE, the message including RNA information indicating a cell and/or a TA, to be added to the RNA of the UE, and to determine whether the cell and/or the TA to be added to the RNA of the UE belongs to the at least one temporary TA, wherein, when the cell and/or the TA belongs to the at least one temporary TA, the RNA information included in the message transmitted to the UE further indicates the timing information for the temporary cell/TA.

In some examples, the message is a Radio Resource Control (RRC) Release message.

In some examples, the timing information comprises a time period during which the cell and/or the TA is to be added to the RNA of the UE. For example, the time period can be defined by a first point of time and a second point of time wherein the second point of time is after the first point of time, and wherein the cell and/or the TA is added to the RNA at the first point of time and removed from the RNA at the second point of time.

In some examples, the RNA information includes at least one of a cell identifier (ID) and an identifier of a Tracking Area (TA).

BRIEF DESCRIPTION OF THE FIGURES

In the following embodiments will be described in greater detail with reference to the attached drawings, in which.

DETAILED DESCRIPTION

Figure 1A:
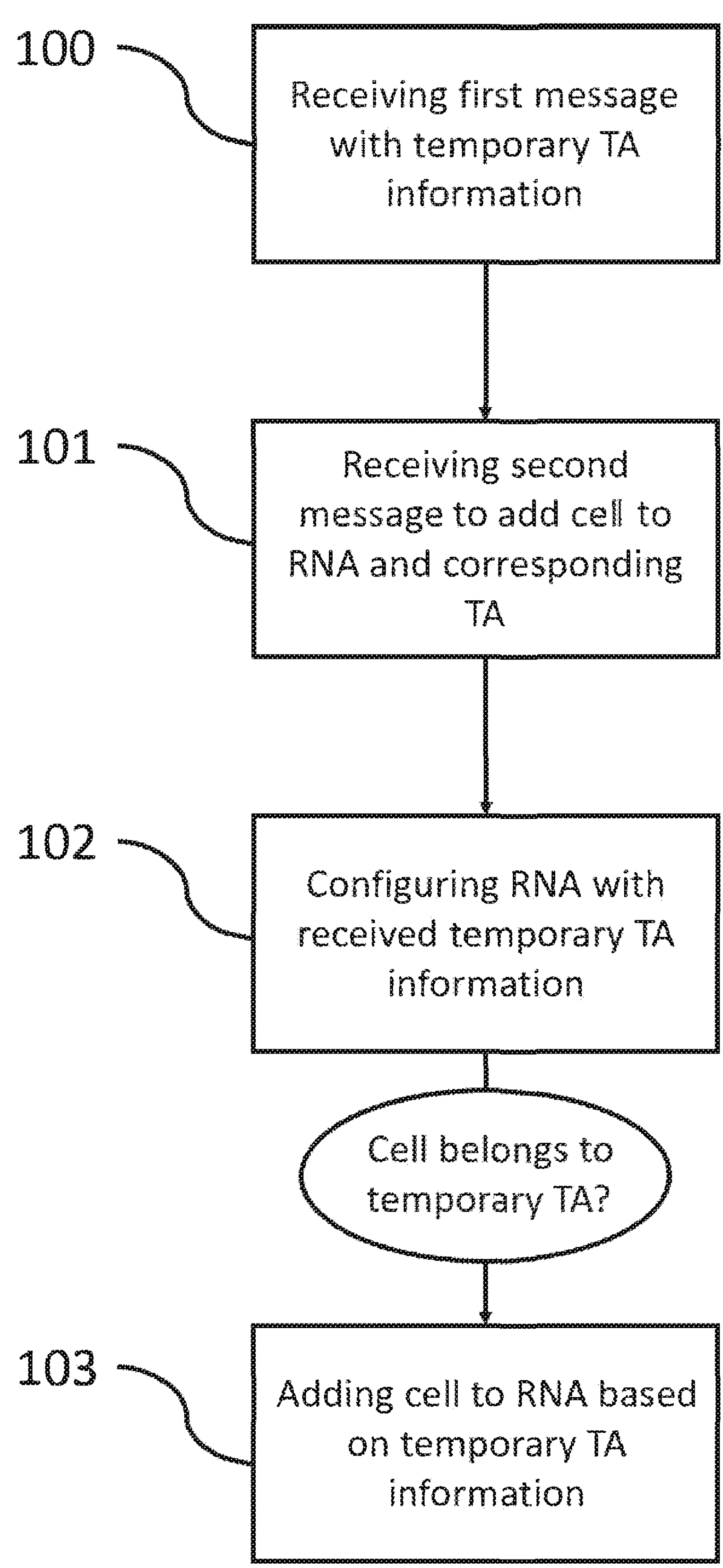
FIG. 1A is a flow chart illustrating one embodiment of a temporary tracking area support procedure.

As mentioned above, a radio access network (RAN) notification area (RNA) is used to effectively find the mobile device when it releases into Radio Resource Control (RRC) INACTIVE state. A mobile device (also referred to as user equipment, UE) in the RRC INACTIVE state can be configured by the last serving NG-RAN node (next generation or gNB) with an RNA. The RNA may be configured with locations where the UE was registered at least once. In this way, the RNA can become very large and at most as large as the complete registration area (RA) of the UE.

The 3GPP standard document TS. 38.300 gives multiple definitions on how the RNA should be configured, e.g. by an explicit list of cells that constitute the RNA or by a list of RAN areas, where a UE is provided (at least one) RAN area ID, where a RAN area is a subset of a core network (CN) Tracking Area (TA) or equal to a CN Tracking Area. A RAN area is specified by one RAN area ID, which consists of a Tracking area Code (TAC) and optionally a RAN area Code. A cell of a gNB broadcasts one or more RAN area IDs in the system information. The Next Generation-RAN (NG-RAN) may provide different RNA definitions to different UEs but not mix different definitions to the same UE at the same time. A UE shall support all RNA configuration options listed above. According to one example the RNA may include one or more Cell Identifiers (IDs) each of which identifies a respective cell that constitute the RNA, or one or more RAN area IDs each of which identifies a respective RAN area.

In any case, the RNA is a subset of the registration area of the UE. It should be noted that the core network knows the location of an idle UE in Registration Management-REGISTERED state with respective to the configured RA. Thus, in case of a network-originated service request (corresponds to mobile terminated service), the Access and Mobility Management Function (AMF) pages the gNBs belonging to the TAs of the RA. The AMF can apply different paging policies, e.g., page only parts of the RA considering the last TA where the UE made the RA update. Thus, there is a trade-off between the size of the RA and paging overhead vs. the RA update frequency. In other words, large RA implies fewer RA updates but more paging signaling, whereas small RA implies more RA updates but less paging signaling. In addition, with smaller RA, the UE could be reached faster and thus might be preferred for certain services with delay constraints.

In case there are temporary tracking areas, i.e. tracking areas that are only used once in a while or at specific time only, some tracking areas can be removed and added to the registration area based on a timer. It is unclear how this behavior will be synced with RNA such that the RNA is constantly kept as a subset of the registration area at any point in time. This invention proposes a method for RNA configuration to comply with Registration area with temporary tracking area deployment. The method introduces solutions to timely remove and add a cell to the RNA, by indicating the relation of each cell with the tracking area they are related to or the explicit timing information being configured to the UE. The UE obtains (e.g., receives or determines) the temporary RNA inclusion information and uses it to determine whether to add or remove a TAC or a cell from the RNA.

Before explaining the invention by embodiments, one method is explained by way of example from a UE's point of view using FIG. 1A. The UE is in CONNECTED state, i.e. is communicatively coupled to a cell of a gNB and also detectable for the CN. At first, at 100, the UE is receiving a first message including TA information indicating timing information for at least one temporary TA from CN. A temporary TA is existing in the registration history of the UE and therefore this TA has to be considered adequately in the RNA in case of a sudden state change of the UE. The timing information of this tracking area includes the start and end time of when the tracking area might be considered in the RNA.

Next, at 101, the UE is receiving a second message including RNA information indicating a cell to be added to the RNA and the TA to which the cell belongs from gNB. This message creates the connection between the reported temporary TA and the associated cell of the RAN Node or gNB.

At 102, the UE is configuring the RNA with the received timing information for the at least one temporary TA. The UE uses the received information from these two messages and initiates an RNA update to include the temporary TA based on a timer. This ensures that the RNA does not become too large and that only the temporary TA should be added if the UE is expected there at a certain time.

Lastly, at 103, when the TA to which the cell belongs is the at least one temporary TA, the UE is temporarily adding the cell to the RNA based on the timing information for the at least one temporary TA In case the UE changes from RRC CONNECTED to RRC INACTIVE mode while it is expected to be in the temporary TA, the CN is paging the temporary TA while it is part of the RNA.

Figure 1B:
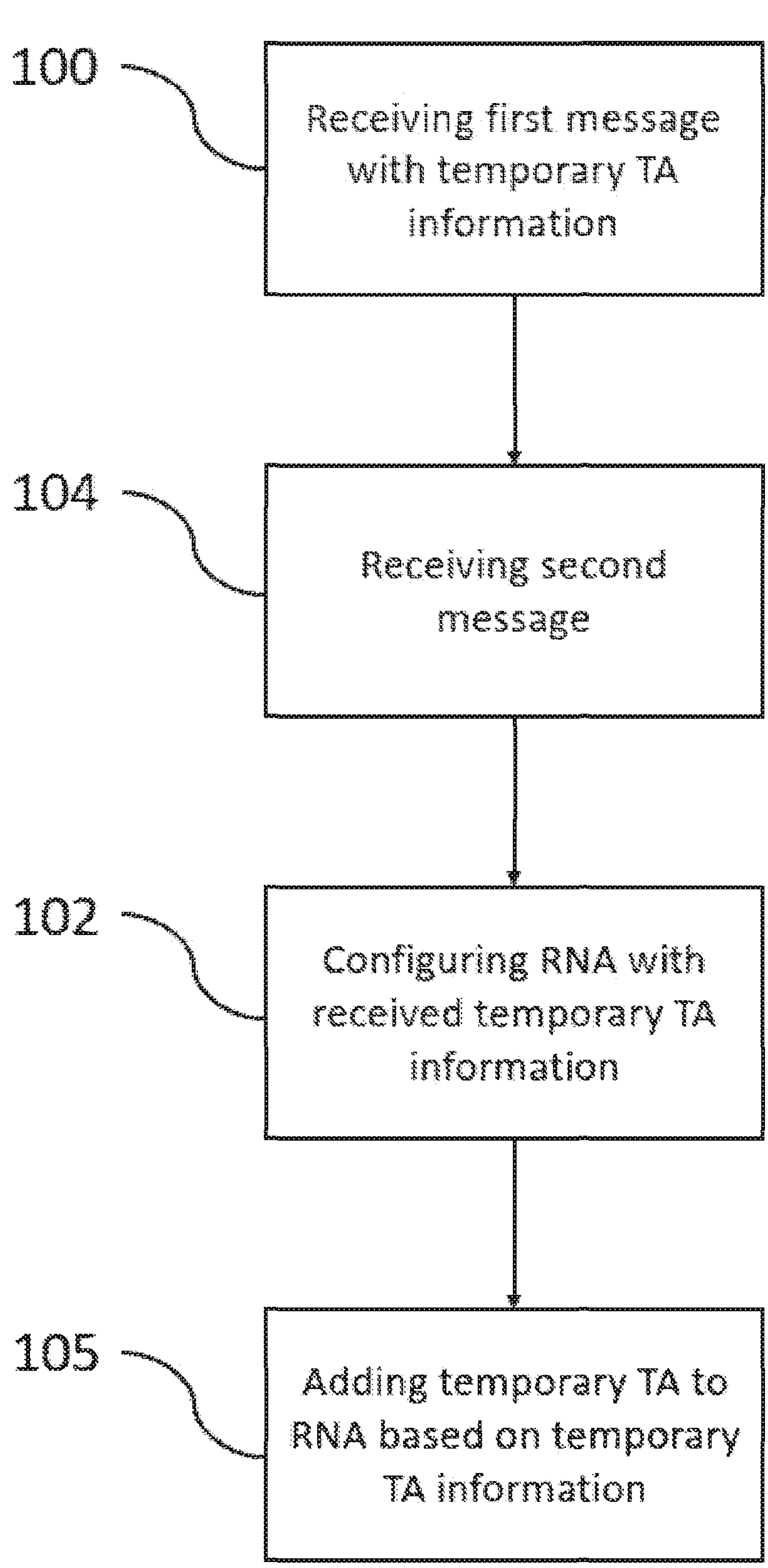
FIG. 1B is a flow chart illustrating another embodiment of a temporary tracking area support procedure.

An alternative method is illustrated by way of example from a UE's point of view in FIG. 1B. As above, the UE is in CONNECTED state, i.e. is communicatively coupled to a cell of a gNB and also detectable for the CN, and is receiving a first message including TA information indicating timing information for at least one temporary TA from CN at 100. Thus, as above, this temporary TA has to be considered adequately in the RNA in case of a sudden state change of the UE. The timing information of this tracking area includes the start and end time of when the tracking area might be considered in the RNA.

Next, at 104, the UE is receiving a second message. In some embodiments, this message is an RRC Release Message.

Similar to FIG. 1A, at 102, the UE is configuring the RNA with the received timing information for the at least one temporary TA. The UE uses the received timing information and initiates an RNA update to include the temporary TA based on the timing information.

Lastly, at 105, the UE is temporarily adding the at least one temporary TA to the RNA based on the timing information. In case the UE changes from RRC CONNECTED to RRC INACTIVE mode while it is expected to be in the temporary TA, the CN is paging the temporary TA while it is part of the RNA.

Figure 2:
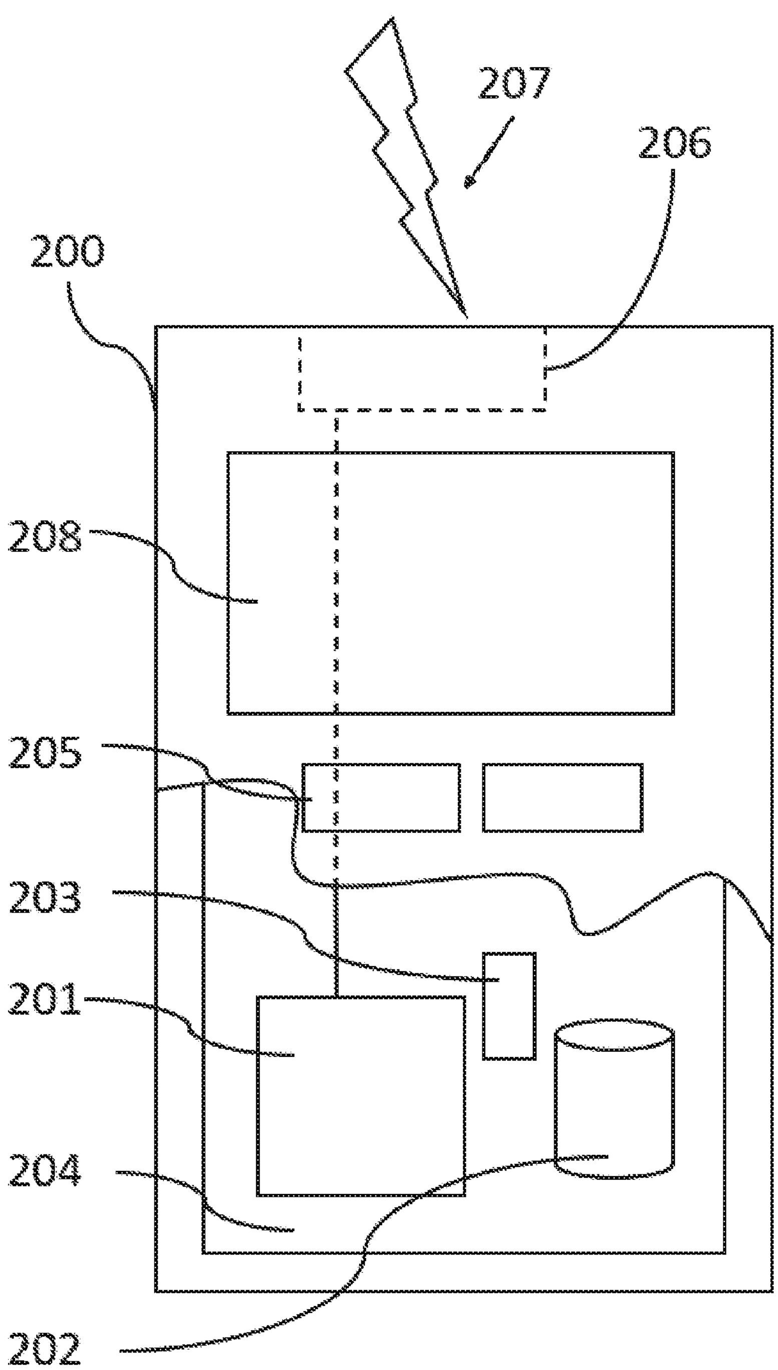
FIG. 2 shows a schematic diagram of an example mobile communication device.

A possible (mobile) communication device 200 will now be described in more detail with reference to FIG. 2 showing a schematic, partially sectioned view. Such a mobile communication device 200 is often referred to as User Equipment (UE), user device or terminal device. An appropriate mobile communication device 200 may be provided by any device capable of sending and receiving radio signals. Non-limiting examples comprise a Mobile Station (MS) or mobile device such as a mobile phone or what is known as a smart phone, a computer provided with a wireless interface card or other wireless interface facility (e.g., USB dongle), Personal Data Assistant (PDA) or a tablet provided with wireless communication capabilities, or any combinations of these or the like. The communication device 200 may provide, for example, communication of data for carrying communications such as voice, electronic mail (e-mail), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g., a robot arm) and/or a modem acting as an Ethernet-hub that will act as a connection point for one or several connected Ethernet devices (which connection may be wired or unwired).

The communication device 200 is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets 204. The user may control the operation of the communication device 200 by means of a suitable user interface such as keypad 205, voice commands, touch sensitive screen or pad, combinations thereof or the like. A display 208, a speaker and a microphone can be also provided. Furthermore, the communication device 200 may comprise appropriate connectors (either wired or wireless) to other devices and/or for connecting external accessories, for example hands-free equipment, thereto.

The communication device 200 may receive signals over an air or radio interface 207 via appropriate apparatus for receiving and may transmit signals via appropriate apparatus for transmitting radio signals. In FIG. 2, transceiver apparatus is designated schematically by block 206. The transceiver apparatus 206 may be provided for example by means of a radio part and associated antenna arrangement. The antenna arrangement may be arranged internally or externally to the communication device 200.

The communication device 200 may also or alternatively be configured to communicate using one or more Global Navigational Satellite Systems (GNSS such as GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Generally, the communication device 200 illustrated in FIG. 2 includes a set of components configured to perform core functions. For example, this set of components may be implemented as a system on chip (SoC), which may include portions for various purposes. Alternatively, this set of components may be implemented as separate components or groups of components for the various purposes. The set of components may be (communicatively) coupled (e.g., directly or indirectly) to various other circuits of the communication device 200.

The communication device 200 may include at least one antenna in communication with a transmitter and a receiver (e.g., the transceiver apparatus 206). Alternatively, transmit and receive antennas may be separate. The communication device 200 may also include a processor (e.g., the at least one data processing entity 201) configured to provide signals to and receive signals from the transmitter and receiver, respectively, and to control the functioning of the communication device 200. The processor may be configured to control the functioning of the transmitter and receiver by effecting control signaling via electrical leads to the transmitter and receiver. Likewise, the processor may be configured to control other elements of the communication device 200 by effecting control signaling via electrical leads connecting processor to the other elements, such as a display (e.g., display 208) or a memory (e.g., the at least one memory 202). The processor may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an Application Specific Integrated Circuit (ASIC), a Field Programmable Gate Array (FPGA), and/or the like, or some combination thereof. Accordingly, in some examples, the processor may comprise a plurality of processors or processing cores.

The communication device 200 may be capable of operating with one or more air interface standards, communication protocols, modulation types, access types, and/or the like. Signals sent and received by the processor may include signaling information in accordance with an air interface standard of an applicable cellular system, and/or any number of different wireline or wireless networking techniques, comprising but not limited to Wi-Fi, WLAN techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the communication device 200 and/or a cellular modem therein may be capable of operating in accordance with various 3rd Generation (3G) communication protocols, 4th generation (4G) communication protocols, $5^{th}$ Generation (5G) communication protocols, Internet Protocol Multimedia Subsystem (IMS) communication protocols such as, for example, Session Initiation Protocol (SIP) and/or the like, or 5G beyond. For example, the communication device 200 may be capable of operating in accordance with 4G wireless communication protocols, such as LTE-A, 5G, and/or the like as well as similar wireless communication protocols that may be subsequently developed.

It is understood that the processor may include circuitry for implementing audio/video and logic functions of the communication device 200. For example, the processor may comprise a digital signal processor device, a microprocessor device, an analog-to-digital converter, a digital-to-analog converter, and/or the like. Control and signal processing functions of the communication device 200 may be allocated between these devices according to their respective capabilities. The processor may additionally comprise an internal voice coder, an internal data modem, and/or the like. Further, the processor may include functionality to operate one or more software programs, which may be stored in memory. In general, the processor and stored software instructions may be configured to cause the communication device 200 to perform actions. For example, the processor may be capable of operating a connectivity program, such as a web browser. The connectivity program may allow the communication device 200 to transmit and receive web content, such as location-based content, according to a protocol, such as Wireless Application Protocol (WAP), HyperText Transfer Protocol (HTTP), and/or the like.

The communication device 200 may also comprise a user interface including, for example, an earphone or speaker, a ringer, a microphone, a display, a user input interface, and/or the like, which may be operationally coupled to the processor. The display may, as noted above, include a touch sensitive display, where a user may touch and/or gesture to make selections, enter values, and/or the like. The processor may also include user interface circuitry configured to control at least some functions of one or more elements of the user interface, such as the speaker, the ringer, the microphone, the display, and/or the like. The processor and/or user interface circuitry comprising the processor may be configured to control one or more functions of one or more elements of the user interface through computer program instructions, for example, software and/or firmware, stored on a memory accessible to the processor, for example, volatile memory, non-volatile memory, and/or the like. The communication device 200 may include a battery for powering various circuits related to the mobile terminal, for example, a circuit to provide mechanical vibration as a detectable output. The user input interface may comprise devices allowing the communication device 200 to receive data, such as a keypad (e.g., keypad 206) and/or other input devices. The keypad can also be a virtual keyboard presented on display or an externally coupled keyboard.

The communication device 200 may also include one or more mechanisms for sharing and/or obtaining data. For example, the communication device 200 may include a short-range radio frequency (RF) transceiver and/or interrogator, so data may be shared with and/or obtained from electronic devices in accordance with RF techniques. The communication device 200 may include other short-range transceivers, such as an infrared (IR) transceiver, a Bluetooth™ (BT) transceiver operating using Bluetooth™ wireless technology, a wireless Universal Serial Bus (USB) transceiver, a Bluetooth™ Low Energy transceiver, a ZigBee transceiver, an ANT transceiver, a cellular device-to-device transceiver, a wireless local area link transceiver, and/or any other short-range radio technology. The communication device 200 and more specifically, the short-range transceiver may be capable of transmitting data to and/or receiving data from electronic devices within the proximity of the apparatus, such as within 10 meters, for example. The communication device 200 including the Wi-Fi or WLAN modem may also be capable of transmitting and/or receiving data from electronic devices according to various wireless networking techniques, including 6LoWPAN, Wi-Fi, Wi-Fi low power, WLAN techniques such as IEEE 802.11 techniques, IEEE 802.15 techniques, IEEE 802.16 techniques, and/or the like.

The communication device 200 may comprise memory, such as one or more Subscriber Identity Modules (SIM), one or more Universal Subscriber Identity Modules (USIM), one or more removable User Identity Modules (R-UIM), one or more Embedded Universal Integrated Circuit Cards (eUICCs), one or more Universal Integrated Circuit Cards (UICC), and/or the like, which may store information elements related to a mobile subscriber. In addition, the communication device 200 may include other removable and/or fixed memory. The communication device 200 may include volatile memory and/or non-volatile memory. For example, the volatile memory may include Random Access Memory (RAM) including dynamic and/or static RAM, on-chip or off-chip cache memory, and/or the like. The non-volatile memory, which may be embedded and/or removable, may include, for example, read-only memory, flash memory, magnetic storage devices, for example, hard disks, floppy disk drives, magnetic tape, optical disc drives and/or media, non-volatile random-access memory (NVRAM), and/or the like. Like volatile memory, the non-volatile memory may include a cache area for temporary storage of data. At least part of the volatile and/or non-volatile memory may be embedded in the processor. The memories may store one or more software programs, instructions, pieces of information, data, and/or the like which may be used by the apparatus for performing operations disclosed herein.

The memories may comprise an identifier, such as an International Mobile Equipment Identification (IMEI) code, capable of uniquely identifying the communication device 200. In the example embodiment, the processor may be configured using computer code stored at memory to cause the processor to perform operations disclosed herein.

Some of the embodiments disclosed herein may be implemented in software, hardware, application logic, or a combination of software, hardware, and application logic. The software, application logic, and/or hardware may reside on the memory, the processor, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

A user equipment (UE) may include a wireless or mobile device, an apparatus with a radio interface to interact with a RAN (Radio Access Network), a smartphone, an in-vehicle apparatus, an IoT device, a M2M device, or else. Such UE or apparatus may comprise: at least one processor; and at least one memory including computer program code; wherein the at least one memory and the computer program code are configured to, with the at least one processor, cause the apparatus at least to perform certain operations, like e.g. RRC connection to the RAN. A UE is e.g. configured to generate a message (e.g. including a cell ID) to be transmitted via radio for a RAN (e.g. to reach and communicate with a serving cell). A UE may generate and transmit and receive RRC messages containing one or more RRC PDUs (Packet Data Units).

The UE may have different states (e.g. according to 3GPP TS 38.331 V16.5.0 (2021 June) sections 42.1 and 4.4, incorporated by reference). A UE is e.g. either in RRC_CONNECTED state or in RRC_INACTIVE state when an RRC connection has been established.

In RRC_CONNECTED state a UE may store the AS (access stratum) context, transfer unicast data to/from the UE, monitor control channels associated with the shared data channel to determine if data is scheduled for the data channel, provide channel quality and feedback information, perform neighboring cell measurements and measurement reporting.

In some embodiments, the communication device 200 (i.e., UE or a user device in a network) comprises the processor (e.g., the at least one data processing entity 201) and the memory (e.g., the at least one memory 202). The memory includes computer program code causing the communication device 200 to perform processing according to the methods described below.

Figure 3:
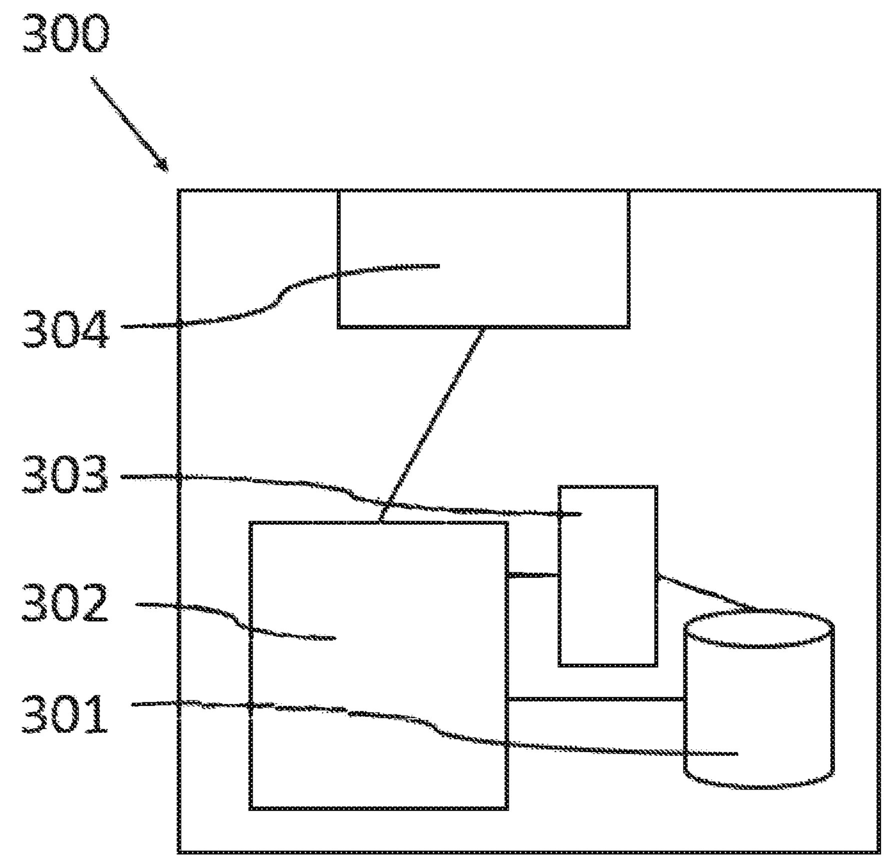
FIG. 3 shows a schematic diagram of an example control apparatus.

FIG. 3 shows an example embodiment of a control apparatus for a communication system, for example to be coupled to and/or for controlling a station of an access system, such as a RAN node, e.g., a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as an RNC or a spectrum controller. In some embodiments, a base station may have such a control apparatus as well as a control apparatus being provided in an RNC. The control apparatus 300 can be arranged to provide control on communications in the service area of the system. The control apparatus 300 comprises at least one memory 301, at least one data processing unit 302, 303 and an input/output interface 304. Via the interface the control apparatus 300 can be coupled to a receiver and a transmitter of the base station. The receiver and/or the transmitter may be implemented as a radio front end or a remote radio head.

Generally, the control apparatus 300 has an antenna, which transmits and receives radio signals. A radio frequency (RF) transceiver module, coupled with the antenna, receives RF signals from antenna, converts them to baseband signals and sends them to processor (e.g., the at least one data processing unit 302, 303). RF transceiver also converts received baseband signals from processor, converts them to RF signals, and sends out to antenna. A processor processes the received baseband signals and invokes different functional modules to perform features in control apparatus 300. Memory (e.g., the at least one memory 301) stores program instructions and data to control the operations of the control apparatus 300. In the example of FIG. 3, the control apparatus 300 also includes protocol stack and a set of control functional modules and circuit. PDU session handling circuit handles PDU session establishment and modification procedures. Policy control module that configures policy rules for UEs. Configuration and control circuit provides different parameters to configure and control UEs of related functionalities including mobility management and session management. Suitable processors include, by way of example, a special purpose processor, a digital signal processor (DSP), a plurality of micro-processors, one or more micro-processor associated with a DSP core, a controller, a microcontroller, ASICs, FPGA circuits, and other type of integrated circuits (ICs), and/or state machines.

In some embodiments, the control apparatus 300 (i.e., a base station, a wireless transmitting and/or receiving point equipment, or a network node in a network) comprises the processor (e.g., the at least one data processing unit 302, 303) and the memory (e.g., the at least one memory 301).

The memory includes computer program code causing the control apparatus 300 to perform processing according to the method described below with reference to FIG. 5 et seq.

Figure 4:
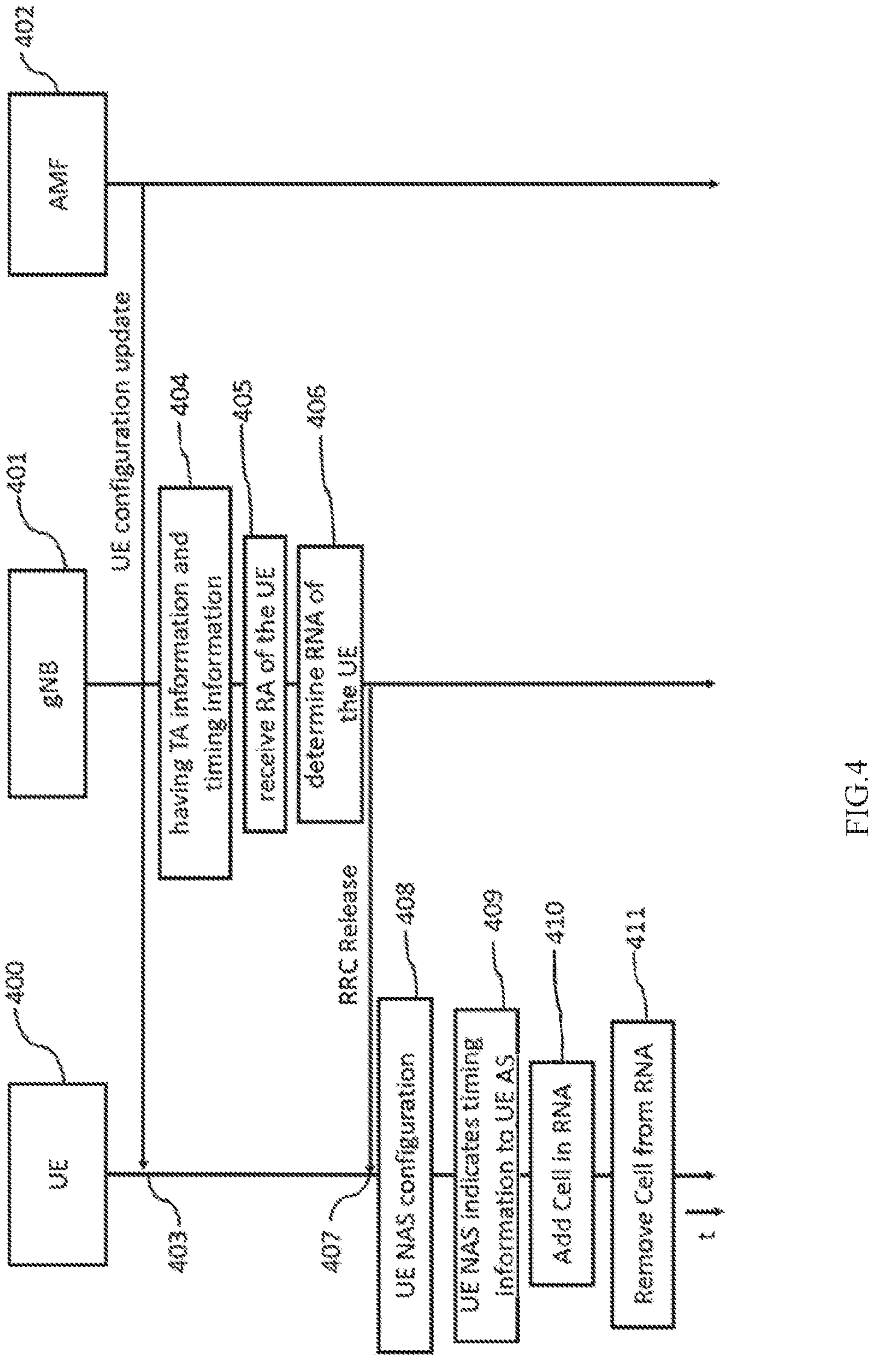
FIG. 4 shows one embodiment of for a temporary tracking area support inclusion to the RNA.

In the next embodiment in FIG. 4, the temporary tracking area procedure support is shown again on a finer granularity including the roles of the gNB 401 and the AMF 402 from CN. The setup is as before, where the UE 400 is in RRC CONNECTED mode to a cell of the gNB and ready to download or send information.

In a first activity, at 403, the AMF 402 sends a UE update request to configure the UE 400 with temporary tracking area information and the TA timing information for the temporary TA. The CN knows based on the UE behavior and the periodically sending RNA updates from the UE 400, the timing information and the tracking area of the UE 400 and may determine which TA is only temporary. The first message is received by the UE 400 over Non-Access Stratum, NAS, signaling from the Access and Mobility Management Function, AMF 402. The functional layer NAS of the protocol stack between the CN and the UE manages all the communication between these two entities when the UE is moving, i.e. changing RAN nodes or cells or registering any new nodes with cells.

Next, at 404, the RAN Node or gNB is aware of the TAC and the temporary tracking area deployment at neighbor cells, so that every entity of the method has the same information and may be synced.

At 405, the gNB needs to know the RA of the UE, so it receives the RA of the UE to determine the RNA of the UE at the next stage 406. While in RRC CONNECTED state, the UE 400 and gNB 401 are free to communicate with each other. Note that, the RNA of the UE may not include the actual RNA of the UE as the RA includes certain cells that belong to temporary tracking areas.

At 407, the UE 400 receives a second message which is a Radio Resource Control, RRC, message from a RAN node 401. Beside the RRC RELEASE procedure, additional information is sent to initiate the temporary TA inclusion to the RNA. The RAN node 401 indicates that the temporary cell has to be included in the RNA and that the temporary cell is related to the temporary TA. Now, every entity has the same information regarding the temporary cell/TA support for the RNA. In specifically this embodiment, this temporary RNA inclusion information is sent by RAN signaling to indicate the information to the UE 400.

In some embodiments, the UE 400 determines whether the TA to which the cell belongs is the temporary TA based on this temporary RNA inclusion information. In other embodiments, the UE 400 determines that the TA to which the cell belongs is the temporary TA upon reception of the second message.

In the next activity, at 408, the UE NAS is configured with the timing information for temporary TAs received via the first message from the AMF 402. The UE Access Stratum (AS) acquires the temporary RNA inclusion information from the UE NAS at 409. The UE AS is then configuring the RNA with the received timing information indicated by the UE NAS for the at least one temporary tracking area.

In the final activities 410 and 411, the UE 400 is now provided with the temporary RNA inclusion information which includes timing information. When the time reaches now a first point of time, the UE 400 adds the temporary cells to the RNA as indicated with the timer and when the time reaches a second point of time which is after the first point of time, the UE 400 removes the temporary cells from the RNA as indicated with the timer.

Figure 5:
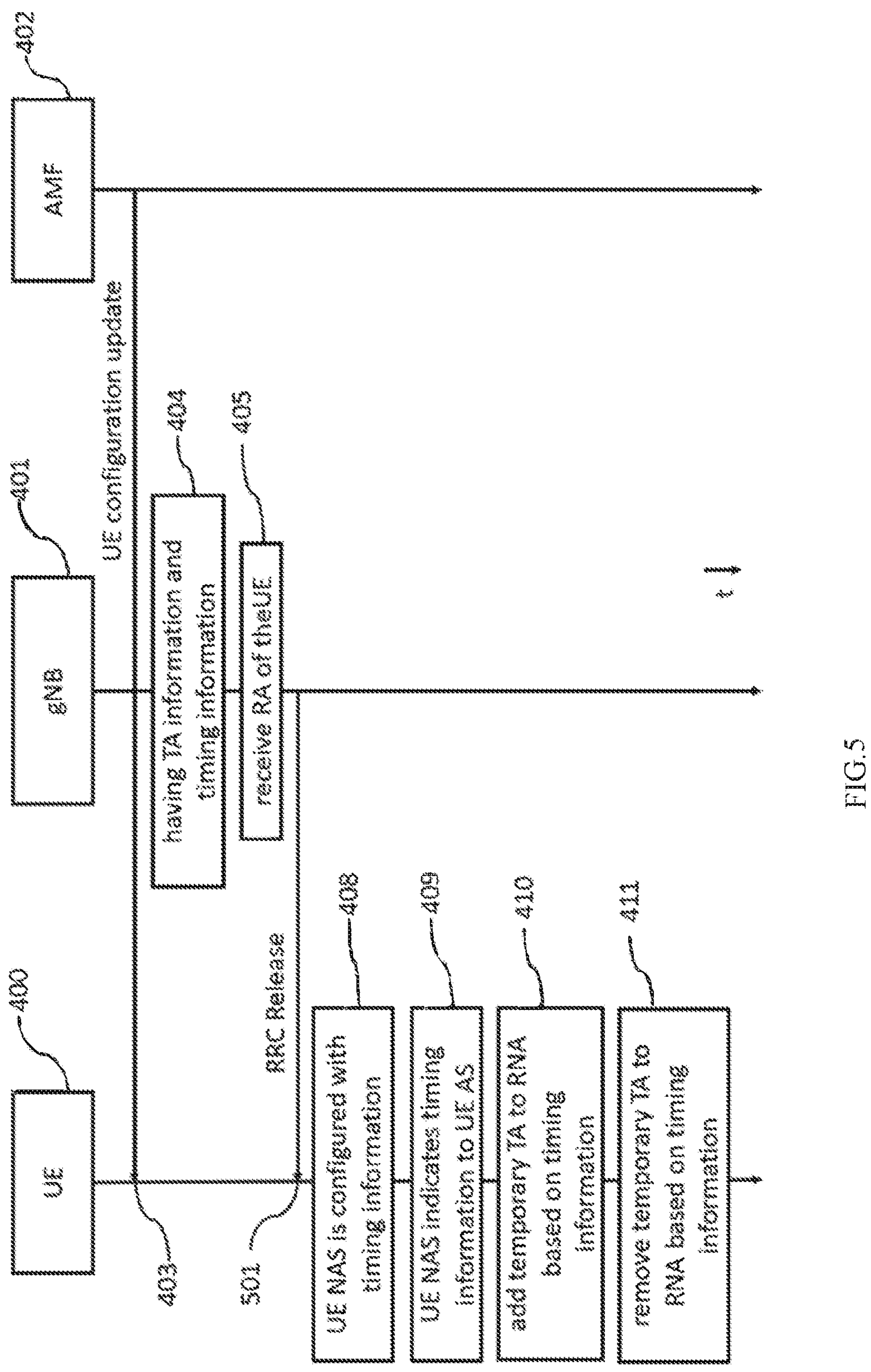
FIG. 5 shows a further embodiment for a temporary tracking area support inclusion to the RNA.

In a further embodiment, in FIG. 5, the RAN node has a further configuration activity in cases the RRC RELEASE may not be used for further information. The RAN node 401 is configured by Operations, Administration and Maintenance (OAM) to not indicate the RNA inclusion information to the UE in the RRC RELEASE message.

As before, the UE is CONNECTED to the gNB and the AMF 402 configures the UE 400 with temporary tracking area information and timing information at 403.

Similarly at 404, the RAN node is aware of the TAC and the temporary tracking area deployment at neighbor cells and receives, at 405, the registration area (RA) of the UE.

Now, at 501, The RAN node 401 updates the UE 400 with an RRC RELEASE message and releases the UE 400 to RRC INACTIVE state, but the RAN node 401 does not include RNA inclusion information this time.

The further procedure activities, are the same as for FIG. 4. So, in 408 the UE AS acquires the temporary RNA inclusion information from the UE NAS. This option, as before, mandates that the UE NAS is preconfigured, at 409, with the TAC based timer information by the AMF 402 from the first message in 403. Being provided the temporary RNA inclusion information, the UE adds and removes TACs from the RNA as indicated with the timer at 410 and 411.

Figure 6:
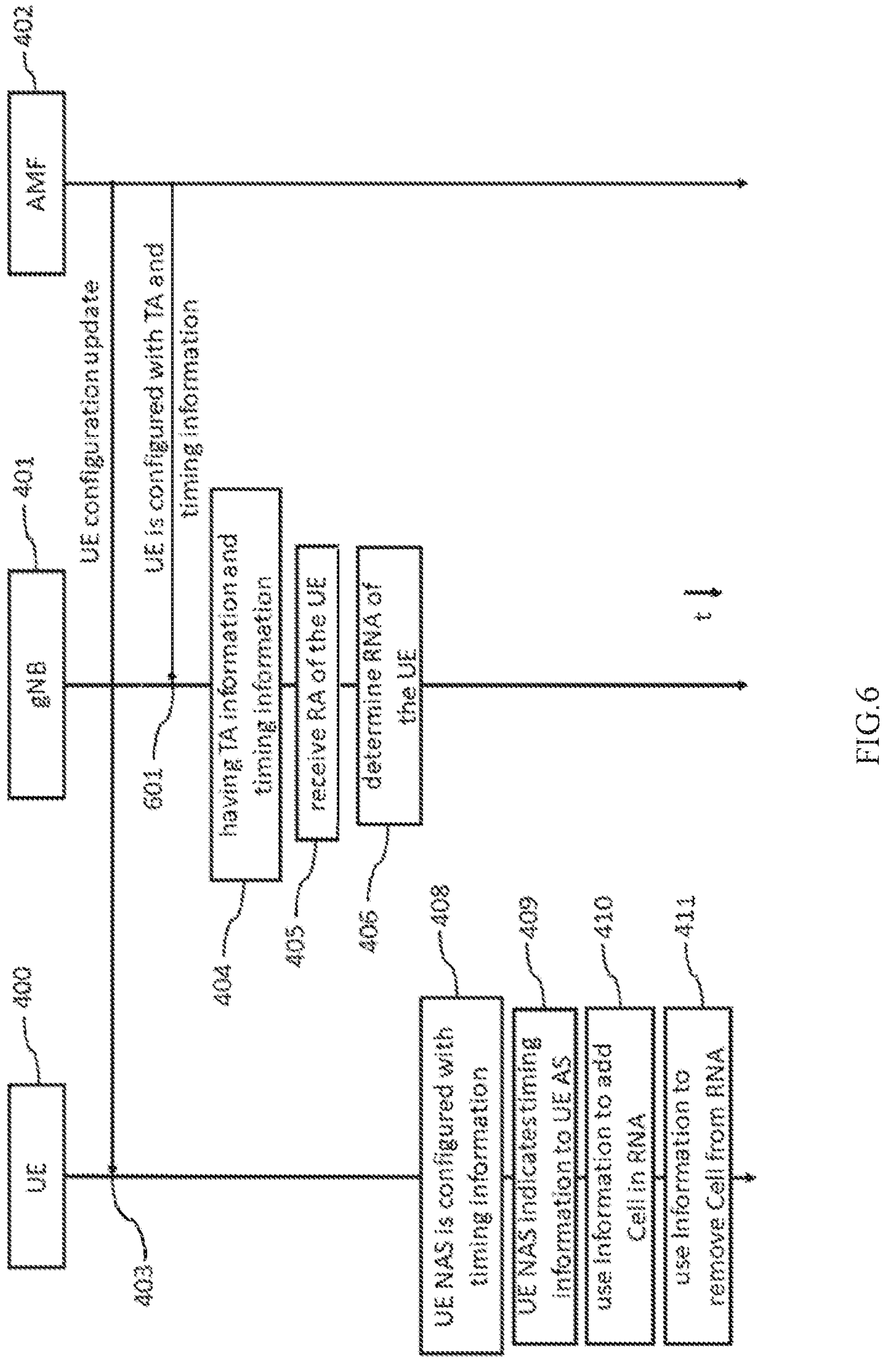
In FIG. 6 visualizes another embodiment for a temporary tracking area support inclusion to the RNA.

In FIG. 6, the AMF 402 configures both, the UE 400 and the gNB 401 beforehand, so that no communication between the gNB and the UE has to be done. This embodiment delivers another method, where no further information needs to be sent in the RRC RELEASE message.

As previously described in FIG. 4, the AMF 402 configures the UE 400 with temporary tracking area information and timing information to be included in the RNA in case the UE changes its RRC state.

The new activity in comparison to FIGS. 4 and 5 is now, at 601, that the AMF informs the gNB that UE is configured with TA timing information for temporary tracking areas in RA.

The further steps are the same as in FIGS. 4 and 5, so in 404 to 406 the gNB is already aware of temporary tracking areas and their timing information, receives the RA of the UE and then determines the RNA based on the information provided by the AMF 402.

If the UE is now released (not shown), no further information needs to be sent, because the RAN node has already all information that is needed to find the UE, which is the difference to FIG. 5.

In the further stages, at 408 to 411, the method follows the exact procedure as explained in FIG. 4, so the UE AS acquires the temporary RNA inclusion information from the UE NAS, which mandates that the UE NAS is preconfigured with the TAC based timer information by the AMF and then the UE 400 being provided with the temporary RNA inclusion information adds and removes TACs from the RNA as indicated with the timer.

Figure 7:
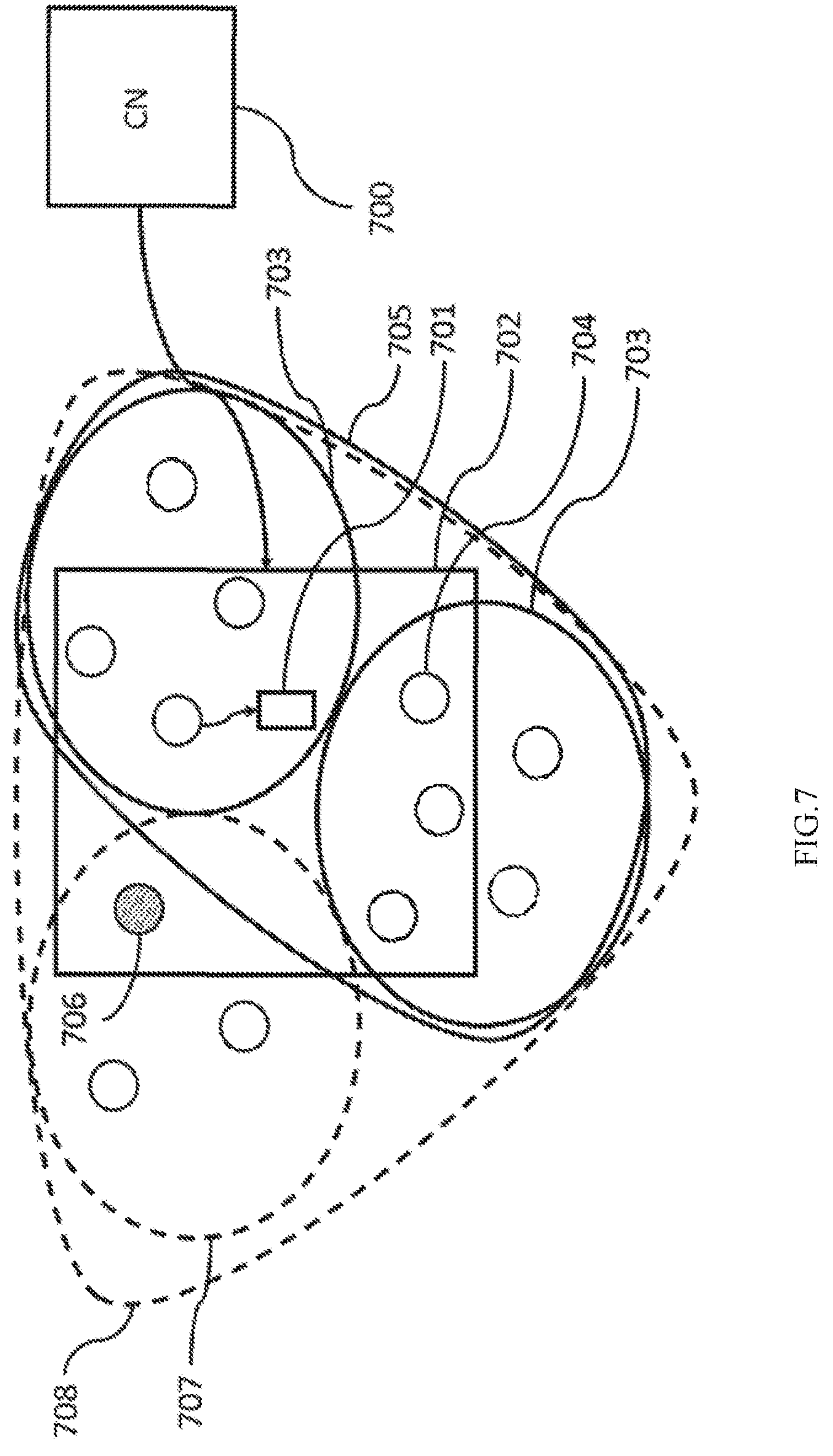
FIG. 7 depicts an exemplary graphical overview on how the invention works.

To show the invention in a more schematic way, FIG. 7 visualizes an example of the method seen from the outside of the system.

Per definition, the RNA has to be a subset of the RA to facilitate the search for the UE in case it is in INACTIVE state and data has to be sent. The UE 701 is RRC CONNECTED to a cell of a base station 704. This cell or gNB is then part of one TA of the UE (e.g. 703). The RA 705 is spanned by all TAs, so it involves the two TAs as shown in FIG. 7. The RNA may then be the whole RA of the UE or a subset as described further above.

In case the UE 701 moves out of the TA, it has to register again with another cell or gNB and send an RNA update which leads to a further TA and a bigger RA of the UE and an adapted RNA based on the RNA configuration in the core network 700. For instance, when a person goes to work from 9 am to 5 pm, it is connected to another gNB that is near the workplace, so temporarily in another TA than his home place, i.e. the area where the UE is registered most of the time. In some cases, the UE does not move locally out of the known tracking areas, but needs another network slice for a specific service. Then the UE 701 registers temporary to another cell or gNB 706 for this service. In both cases, due to the definition of the RNA, the cell 706 and/or TA 707 has to be included to the RA 708, so that the RNA 702 is a subset of the RA 708. As discussed above, a greater RA and/or RNA may lead to a paging overhead. So, a temporary inclusion of cells and/or TAs to the RNA leads to a resource and time save to find an RRC INACTIVE UE.

Figure 8:
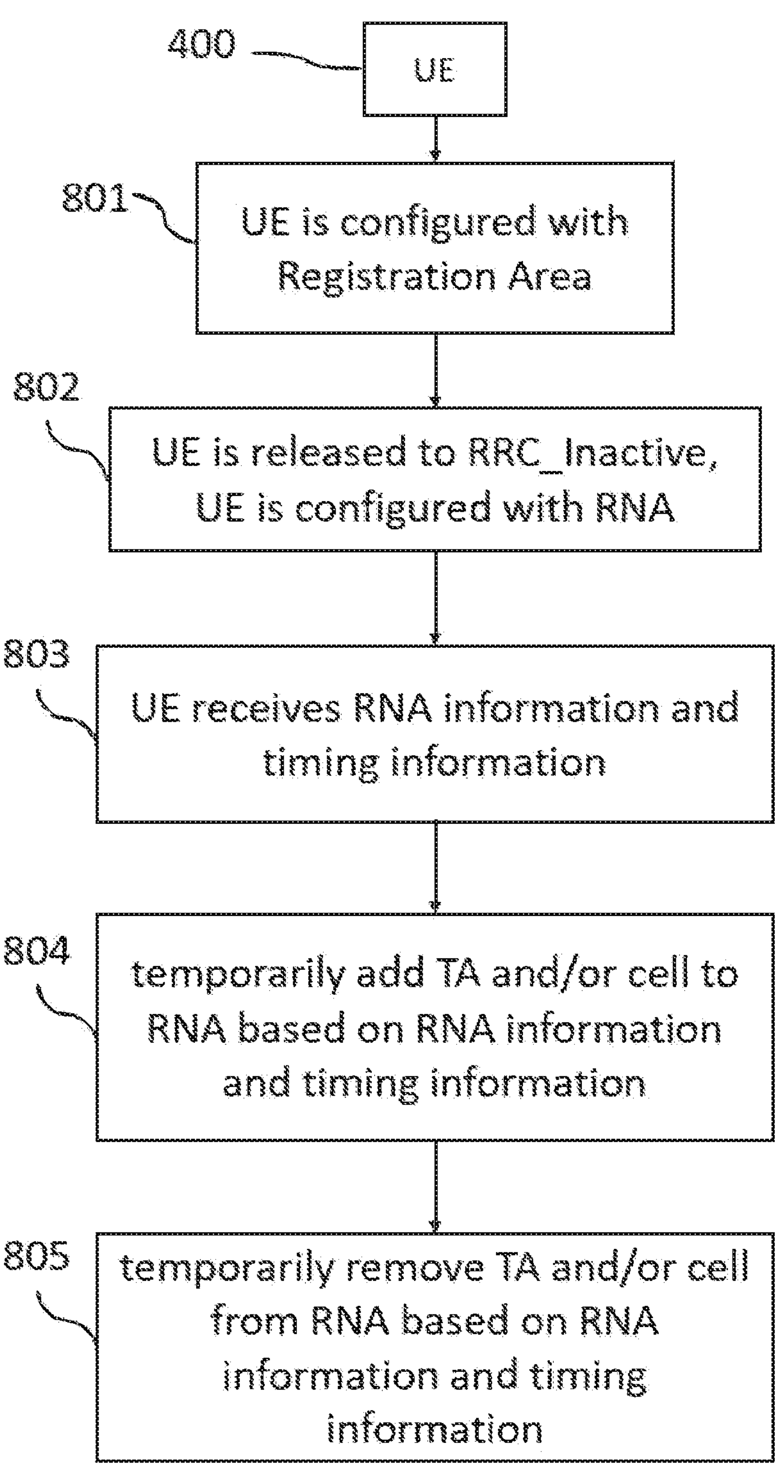
FIG. 8 is a flow chart illustrating the method from UE perspective.

On UE side only, the embodiment is exemplary shown in FIG. 8.

The UE 400 is configured with registration area, which is formed by the plurality of TAs in 801 and where the registration area has temporary tracking area support and the corresponding timing information.

Then, at 802, the UE 400 is released to RRC INACTIVE state and is configured with the RAN notification area.

After that, at 803, the UE 400 receives temporary RNA inclusion information to temporarily include or remove cells and/or TAs from the RAN notification area and the corresponding timing information, i.e. the starting time and end time, when the cell and/or TA has to be added or removed.

When the Time reaches a specific point of time while the UE is in RRC INACTIVE state and does not actively send RNA updates, the UE uses temporary RNA inclusion information to temporarily add TAs and/or cells temporarily to the RNA as dictated by the timer at 804.

Likewise at 805, when the time reaches a point of time which is after the first point of time, then the UE uses temporary RNA inclusion information to temporarily remove TAs and/or cells temporarily from the RNA as dictated by the timer.

Figure 9:
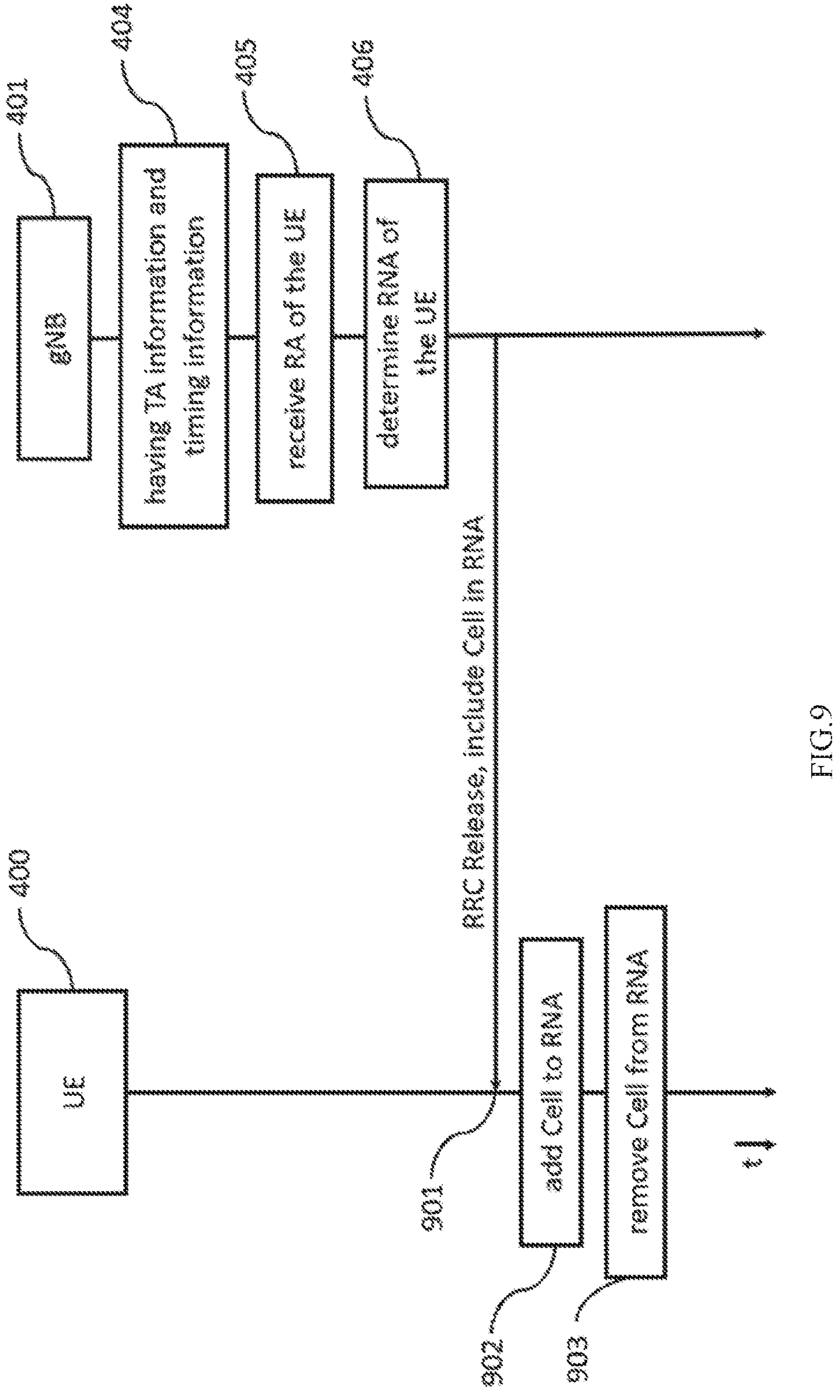
FIG. 9 shows another embodiment for a temporary cell inclusion into the RNA.

In another embodiment in FIG. 9, the method comprises a UE 400 and a gNB 401 where UE gets directly from the RAN node all the necessary information without determining or configuring anything.

As already described multiple times in FIGS. 4-6, in activities 404 to 406, the RAN node/gNB is aware of the TAC and the temporary tracking area deployment at neighbor cells. So, it receives the registration area (RA) of the UE and determines that the RNA of the UE may not comprise the RNA of the UE as the RA comprises certain cells that belongs to temporary tracking areas.

The RAN node indicates the timing information for a cell to be removed and added timely to the RNA of the UE in an extra piece of information in the RRC RELEASE message to the UE at 901.

The UE which is being provided with the temporary RNA inclusion information, adds the cells to the RNA at 902 and removes the cells from the RNA as indicated with the timer at 903.

Figure 10:
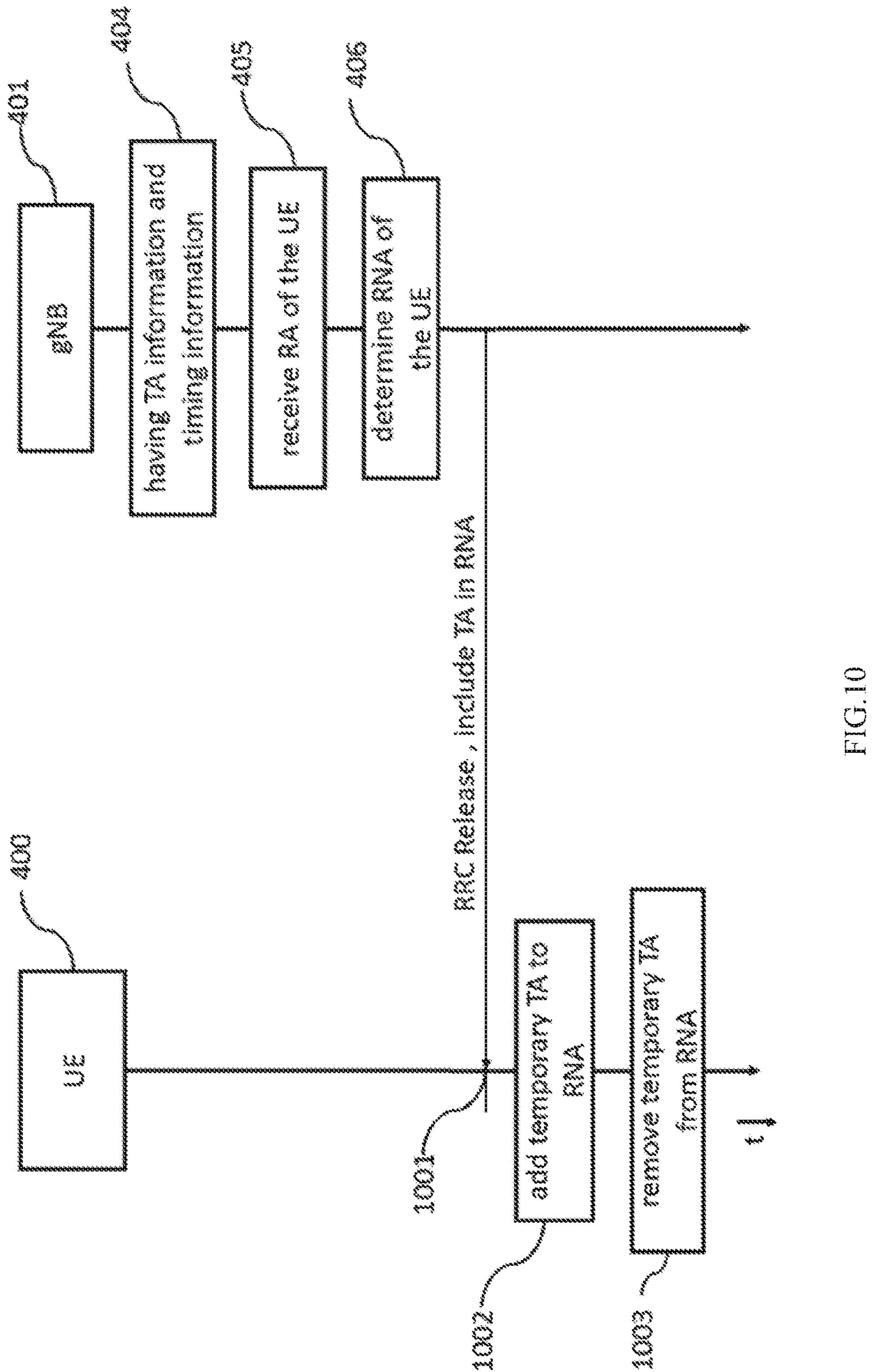
FIG. 10 shows another embodiment of a temporary tracking area support inclusion into the RNA.

In the same setup, the UE may include tracking areas instead of cells to the RNA as depicted in FIG. 10

The activities 404 to 406 remain the same, but instead of indicating the timing information from a cell, in 1001 the timing information from a tracking area has to be added and removed timely to the RNA of the UE. This message is sent via the RRC RELEASE message again.

The UE which is being provided with the temporary RNA inclusion information, adds the TAs to the RNA at 1002 and removes the TAs from the RNA as indicated with the timer at 1003.

It is noted that whilst embodiments have been described in relation to LTE and 5G NR, similar principles can be applied in relation to other networks and communication systems where enforcing fast connection re-establishment is required. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes exemplary embodiments, there are several variations and modifications which may be made to the disclosed solution without departing from the scope of the subject disclosure.

In general, the various exemplary embodiments may be implemented in hardware or special purpose circuits, software, logic or any combination thereof. Some aspects of the subject disclosure may be implemented in hardware, while other aspects may be implemented in firmware or software which may be executed by a controller, microprocessor or other computing device, although the subject disclosure is not limited thereto. While various aspects of the subject disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of the subject disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may comprise one or more of general-purpose computers, special purpose computers, microprocessors, digital signal processors (DSPs), application specific integrated circuits (ASICs), FPGA, gate level circuits and processors based on multi-core processor architecture, as non-limiting examples.

Example embodiments of the subject disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of the subject disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of the subject disclosure as defined in the appended claims. Indeed, there is a further embodiment comprising a combination of one or more embodiments with any of the other embodiments previously discussed.

We claim:

1. A method comprising:

receiving, by a user equipment (UE) from a radio access network (RAN) node, a message including RAN Notification Area (RNA) information indicating at least one of a tracking area (TA) or a cell that is to be temporarily added to an RNA of the UE, and timing information for the TA or the cell that is to be temporarily added to the RNA of the UE; and temporarily adding the at least one of the TA or the cell to the RNA based on the timing information.

2. The method according to claim 1, wherein the timing information comprises a time period during which the at least one of the TA or the cell is to be temporarily added to the RNA of the UE.

3. The method according to claim 1, wherein the RNA information includes at least one of the following:

a cell identifier of the cell that is to be temporarily added to the RNA of the UE; or an identifier of the TA that is to be temporarily added to the RNA of the UE.

4. The method according to claim 3, wherein the timing information comprises at least one of the following:

a first time period associated with the cell identifier of the cell during which the cell is to be temporarily added to the RNA of the UE; or a second time period associated with the identifier of the TA during which the TA is to be temporarily added to the RNA of the UE.

5. The method according to claim 1, further comprising:

determining an expiration of a time period associated with a serving cell that is serving the UE, the serving cell being indicated by a cell identifier of the cell included in the RNA information; and sending a RAN notification area update based on the expiration of the time period associated with the serving cell.

6. The method according to claim 1, further comprising:

determining an expiration of a time period associated with the TA, wherein the TA includes a serving cell that is serving the UE, the TA being indicated by an identifier of the TA included in the RNA information and the identifier of the serving cell not being included in the RNA information; and sending a RAN notification area update based on the expiration of the time period associated with the TA.

7. The method according to claim 1, wherein the message is a Radio Resource Control, RRC, Release message.

8. A user equipment (UE), comprising:

at least one processor; and at least one memory storing instructions that, when executed by the at least one processor, cause the UE at least to:

receive, from a radio access network (RAN) node, a message including radio access network notification area (RNA) information indicating at least one of a tracking area, TA, or a cell that is to be temporarily added to a radio access network notification area (RNA) of the UE, and timing information for the TA or the cell that is to be temporarily added to the RNA of the UE; and temporarily adding the at least one of the TA or the cell to the RNA of the UE based on the timing information.

9. The UE according to claim 8, wherein the message is a Radio Resource Control, RRC Release message.

10. The UE according to claim 8, wherein the timing information comprises a time period during which the at least one of the TA or the cell is to be temporarily added to the RNA.

11. The UE of claim 8, wherein the RNA information includes at least one of the following:

a cell identifier of the cell; or an identifier of the TA.

12. The UE according to claim 11, wherein the timing information comprises at least one of the following:

a first time period associated with the cell identifier of the cell during which the cell is to be temporarily added to the RNA of the UE; or a second time period associated with the identifier of the TA during which the TA is to be temporarily added to the RNA of the UE.

13. The UE according to claim 8, wherein the instructions, when executed by the at least one processor, further cause the UE at least to:

determining an expiration of a time period associated with a serving cell that is serving the UE, the serving cell being indicated by a cell identifier included in the RNA information; and sending a RAN notification area update based on the expiration of the time period associated with the serving cell.

14. The UE according to claim 8, wherein the instructions, when executed by the at least one processor, further cause the UE at least to:

determining an expiration of a time period associated to the TA, wherein the TA includes a serving cell that is serving the UE, the tracking area being indicated by an identifier of the TA included in the RNA information and the identifier of the serving cell not being included in the RNA of the UE; and sending a RAN notification area update based on the expiration of the time period associated with the TA.

15. The UE according to claim 8, wherein the UE comprises a baseband module configured to manage reception of the message.

* * * * *